United States Patent
Manzado et al.

(10) Patent No.: US 6,490,294 B1
(45) Date of Patent: Dec. 3, 2002

(54) APPARATUS AND METHOD FOR INTERCONNECTING ISOCHRONOUS SYSTEMS OVER PACKET-SWITCHED NETWORKS

(75) Inventors: Marcel Manzado, Los Gatos, CA (US); Abid Farooq, Danville, CA (US); Steven R. Cole, San Jose, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/046,891

(22) Filed: Mar. 23, 1998

(51) Int. Cl.$^7$ .......................... H04L 12/56; H04L 7/02; H04L 7/04; H04J 3/17
(52) U.S. Cl. .................. 370/465; 370/389; 370/395; 370/439; 375/356; 375/362
(58) Field of Search ................. 370/468, 435, 370/437, 470, 352, 353, 354, 355, 356, 335, 395, 403, 461, 465, 389, 394, 474, 471, 420, 421, 401, 524; 375/362

(56) References Cited

U.S. PATENT DOCUMENTS

| | | | |
|---|---|---|---|
| 4,772,536 A | | 9/1988 | Baran et al. |
| 4,782,485 A | | 11/1988 | Gollub |
| 5,255,291 A | * | 10/1993 | Holden et al. .............. 375/362 |
| 5,396,494 A | * | 3/1995 | Roposh ...................... 370/439 |
| 5,533,018 A | * | 7/1996 | DeJager et al. ............. 370/395 |
| 5,544,163 A | | 8/1996 | Madonna |
| 5,546,392 A | * | 8/1996 | Boal et al. .................. 370/458 |
| 5,583,856 A | | 12/1996 | Weir .......................... 370/359 |
| 5,594,732 A | * | 1/1997 | Bell et al. ................... 370/401 |
| 5,598,415 A | * | 1/1997 | Nuber et al. ................ 370/474 |
| 5,606,562 A | * | 2/1997 | Landguth .................... 370/506 |
| 5,831,978 A | * | 11/1998 | Willars et al. .............. 370/335 |
| 5,953,350 A | * | 9/1999 | Higgins ...................... 370/524 |
| 5,995,506 A | * | 11/1999 | Fujimori ..................... 370/389 |

OTHER PUBLICATIONS

Platt, R, "Why Isoethernet Will Change the Voice and Video Worlds", *IEEE Communications Magazine*, IEEE Service Center, Piscataway, NJ, vol. 34, No. 4, Apr. 1, 1996, pp. 55–59.

Castel–Branco L. et al., "Clock Recovery for Circuit Emulation Services Over ATM", *Broadband Communications*, Global Infrastructure for the Information Age, Proceedings of the International IFIP–IEEE Conference on Broadband Communications, Canada, 1996, London, Chapman and Hall, Apr. 1, 1996, pp. 617–625.

Montgomery W.A., "Techniques for Packet Voice Synchronization", *IEEE Journal on Selected Areas in Communications*, IEEE Journal on Selected Areas in Communications, IEEE Inc., New York, vol. SAC–1, No. 6, Dec. 1, 1983, pp. 1022–1028.

\* cited by examiner

Primary Examiner—Wellington Chin
Assistant Examiner—M. Phan (57) ABSTRACT

A telecommunications system (18) is provided that includes a first controller (20) and a second controller (22) coupled using a packet-switched network (32). The controllers provide a low cost means of coupling isochronous telecommunication devices. The first controller (20) receives one or more isochronous input channels from a common control shelf (24), such as a private branch exchange (PBX), over a circuit-switched network (27). The first controller (20) encapsulates an isochronous frames from the common control shelf (27) into a data frame that is transferrable over the packet-switched network (32). The second controller (22) is configured to receive the data frame and extract the isochronous frame, which is then transmitted to a peripheral shelf (26), such as a line trunk unit (LTU), using an isochronous circuit-switched network (38). The controllers contain identical functionality, permitting bi-directional transmission of data between the common control and peripheral shelves. Each controller includes multiplex/de-multiplex functions normally associated with isochronous telephony, as well as a packetize/de-packetize functions for transferring data over the packet-switched network (32). The arrival rate of the data packets is used for synchronizing the two controllers.

18 Claims, 12 Drawing Sheets

APPARATUS AND METHOD FOR INTERCONNECTING ISOCHRONOUS SYSTEMS OVER PACKET-SWITCHED NETWORKS

BACKGROUND OF THE INVENTION

1. Field of the Invention

The present invention relates generally to telephony networks, and in particular, to a telecommunications system that allows isochronous networks to be interconnected by non-isochronous packet-switched networks.

2. Description of the Related Art

A digital communications network simultaneously connects many users to one another over shared transmission paths. To accomplish this, these networks typically include some form of "switching". Switching enables the reconfiguration of point-to-point connections in the network, and usually takes one of two basic forms—circuit switching or packet switching.

In circuit switching, the network connects a bit stream to a destination for relatively long periods of time using a dedicated circuit. For example, in a telecommunications network, the circuit is formed for the duration of one telephone call. An important property of circuit switching is the need to set up an end-to-end path before any data can be sent over the network. Once a call has been set up, the dedicated circuit between nodes exists, and will continue to exist until the telephone call is finished. As a consequence of establishing a dedicated circuit, there is no danger of having the call disconnected due to excessive network traffic.

An alternative to circuit switching is packet switching. When this form of switching is used, no dedicated path is established in advance between the transmitter and receiver. Instead, when the transmitter is ready to send data, the data is encapsulated into relatively short bundles of bits called "packets", and a destination address is appended. Then, the packet is sent over the network to the destination address without using a dedicated circuit. The advantage of packet switching is that the bit stream between the source and destination includes only the packets needed to transmit data. This leads to a more efficient use of network bandwidth.

The key difference between packet-switching and circuit-switching is that circuit switching statically reserves the required bandwidth in advance, whereas packet switching acquires and releases it as it is needed. With circuit switching, any unused bandwidth on an allocated circuit is wasted. In contrast, with packet switching, unused bandwidth can be utilized by other packets from unrelated sources because the transmission circuits are not dedicated to individual sources.

Telecommunication devices are typically interconnected using circuit-switched networks, such as the T1, T2, T3, and T4 carriers developed by the Bell System, or the E1, E2, E3 carriers established by CCITT. These standard networks are isochronous, that is, data is transferred between devices which are operating at the same average bit rate.

In addition to being isochronous, conventional telecommunications networks are designed to handle pulse-coded modulated (PCM) voice as well as signalling information. PCM voice is a digital representation of voice input or computer data that is transmitted through a conventional analog telephone input using a modem. Signalling information is digital data that does not represent PCM voice and is generally used for call setup.

Figure 1:
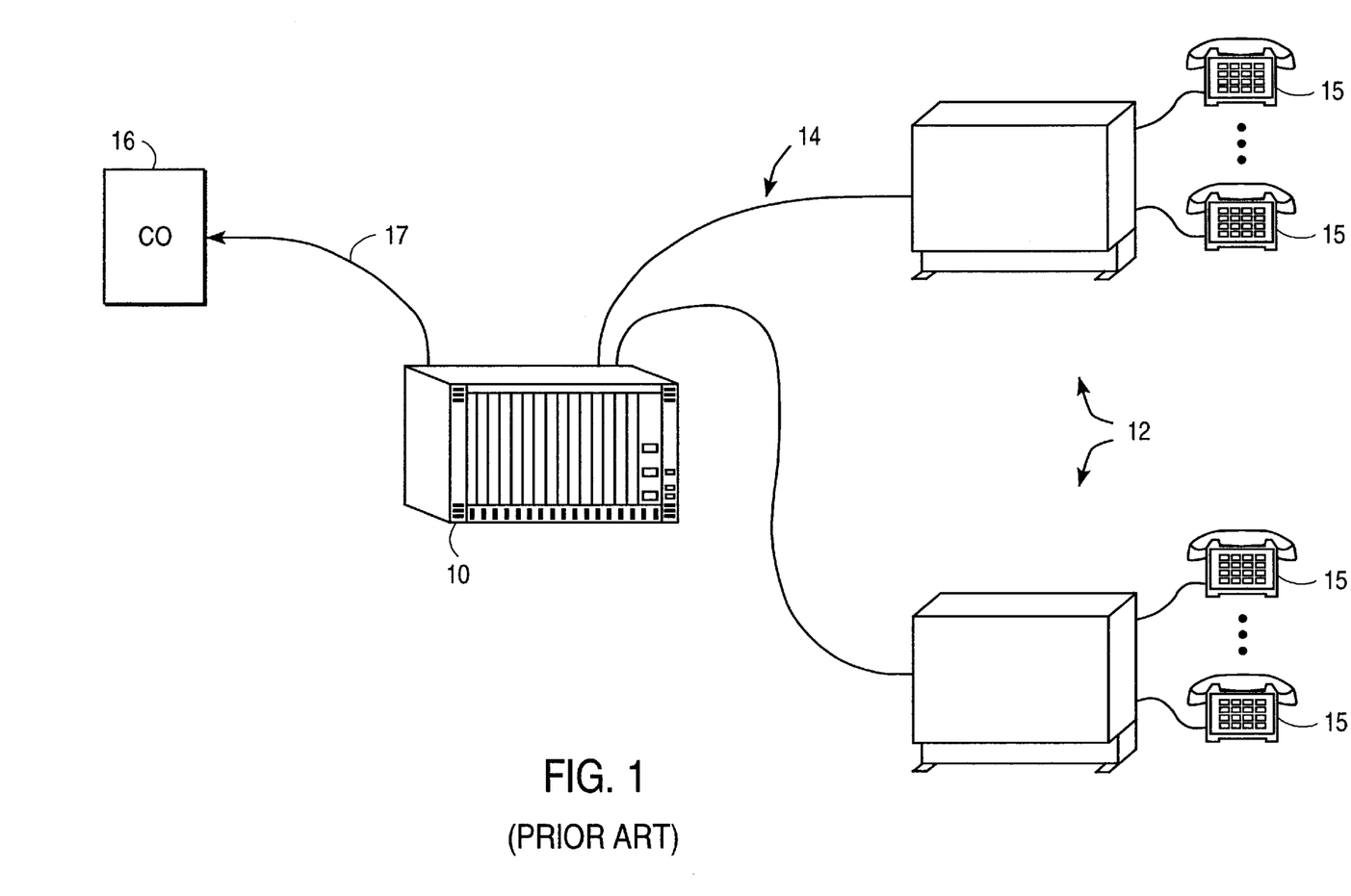
FIG. 1 illustrates a prior art telecommunications system.

FIG. 1 illustrates a prior art subscriber telecommunications network. The network include a common control shelf 10 connected to two remote peripheral shelves 12 using a conventional circuit-switched network 14. The common control shelf 10 is also connected to the central office (CO) 16 of a common carrier using a public switched telephone network (PSTN) 17. The circuit-switched network 14 and the PSTN 17 are both isochronous networks. One or more peripheral units 15, such as telephones, modems, faxes, etc., are connected to the peripheral shelves 12.

The common control shelf 10 mediates digital communications among the peripheral shelves 12, as well as communications between the peripheral shelves 12 and the CO 16. The common control shelf 10 provides switching and call setup services to the peripheral shelves 12 and can be implemented using a private branch exchange (PBX), such as the Hicom 300 E manufactured by Siemens Corporation.

Each peripheral shelf 12 includes a plurality of analog or digital ports and interface circuits for connecting a group of peripheral units 15. All calls placed between peripheral units or to the CO 16 are routed through the common control shelf 10. The peripheral shelves 12 can be local line trunk units (LTUs) or remote LTUs located several kilometers (up to 700 miles) from the common control shelf 10. Remote LTUs can be implemented using a Remote Communication Module (RCM) manufactured by Siemens Corporation. Private subscriber networks, such as shown in FIG. 1, can be used to interconnect users within a local campus. For example, in a campus environment having many distributed users, RCMs can be remotely located throughout the campus to serve various groups of telecom users. The RCMs can be connected to one or more PBXs using standard circuit-switched network technology. Typically, a PBX is used to interconnect a plurality of RCMs or LTUs allowing calls to be placed between various groups located within the campus. In addition, the PBX can also be attached to a telephone company's central office, allowing users to place calls outside the campus. A PBX typically provides bandwidth and switching capacity to the LTUs/RCMs and thus, a PBX can act as a central switching hub for several RCMs and LTUs.

Although PBXs provide communications bandwidth, they can only support a limited number of users. When new users are added to the campus system, it is often necessary to increase the telecommunications bandwidth by adding more LTUs and RCMs or more PBXs. In many instances, this is very expensive because adding new PBXs and LTUs and RCMs requires additional copper cabling and networking of the PBXs.

In other situations, it is often necessary to move users to different locations within a campus. This frequently requires additional copper cabling. Thus, a simple move can become very expensive because of the high costs of relocating conventional phone lines and PBXs.

In order to eliminate the cost of copper cabling it is known to provide circuit-switched PBXs and RCMs that rely on fiber optic technology. However, these PBXs and RCMs are generally expensive. Moreover, incorporating fiber-optic telecommunications equipment into pre-existing copper-based subscriber networks typically requires costly upgrades that are often unacceptable to many customers.

It is also known to use low-cost packet networks for telephony. For instance, U.S. Pat. No. 5,594,732 discloses a network bridge for transferring isochronous signalling messages using a non-isochronous packet network. However, this reference does not disclose a device that performs the multiplexing/demultiplexing associated with isochronous telephony, as well as the "packetizing" associated with packet-switched networks. Therefore, the '732 patent does not provide a device that can be easily integrated into an existing telephone network.

Therefore, there is a need for a system and method that allows a conventional telephony network to be expanded at a lower cost and without the need for replacing the existing infrastructure of switching gear.

SUMMARY OF THE INVENTION

It is an advantage of the present invention to overcome the limitations of the prior art telecommunications networks. It is also an advantage of the present invention to provide a system and method that allows a low-cost packet-switched network to be inserted into an isochronous circuit-switched network. This allows public or private telecommunications networks to be upgraded and expanded with a substantial savings in cost.

These and other advantages of the present invention are realized by providing a novel system and method for transmitting isochronous telecommunications data frames over a packet-switched network.

According to one embodiment of the present invention, a telecommunications system is provided that includes a first controller and a second controller coupled using a packet-switched network. The first controller receives one or more isochronous input channels from a common control shelf, such as a private branch exchange (PBX), over a circuit-switched network. The first controller encapsulates an isochronous frames from the common control shelf into a data frame that is transferrable over the packet-switched network. The second controller is configured to receive the data frame and extract the isochronous frame, which is then transmitted to a peripheral shelf, such as a line trunk unit (LTU), using an isochronous circuit-switched network.

The controllers contain identical functionality, permitting bi-directional transmission of data between the common control and peripheral shelves. Each controller includes multiplex/de-multiplex functions normally associated with isochronous telephony, as well as a packetize/de-packetize functions for transferring data over the packet-switched network.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings, in which:

DETAILED DESCRIPTION OF THE INVENTION

Figure 2:
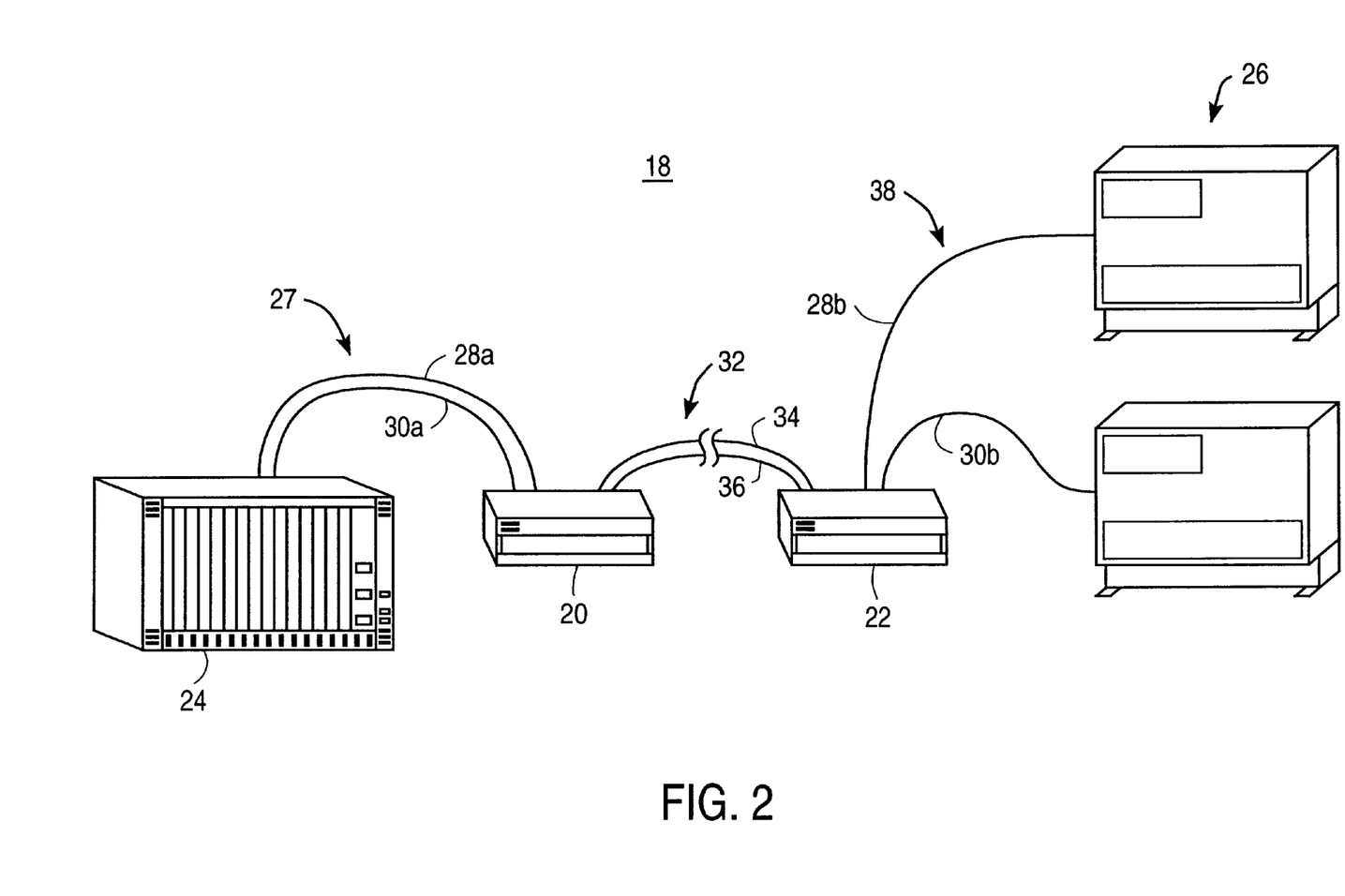
FIG. 2 illustrates a telecommunications system in accordance with an embodiment of the present invention.

Referring now to the drawings, and more particularly to FIG. 2, there is illustrated a telecommunications system 18 that permits common and peripheral isochronous telecommunications shelves 24, 26 to be connected using a packet-switched network 32. The packet-switched network 32 is essentially inserted into an otherwise standard circuit-switched telephony network. To accomplish this, the system includes a first controller 20 and a second controller 22 coupled using the packet-switched network 32. The first controller 20 is also coupled to the common control shelf 24 using a main isochronous data link 27, while the second controller 22 is coupled to one or more peripheral shelves 26 using a peripheral isochronous data link 28. Communication across the data links 27, 38 is achieved using a conventional circuit-switched protocol, such as HDLC over a time division multiplexing (TDM) network. Accordingly, the first and second controllers 20, 22 act as bridges, allowing data to be transferred between the circuit-switched data links 27, 38 and the packet-switched network 32.

The common control shelf 24 can be any equipment used for transferring isochronous telecommunications data, such as a PBX or a computerized branch exchange (CBX). Although its functionality is not so limited, the common control shelf 24 can provide switching and call setup services for calls placed between the peripheral shelves 26. The peripheral shelves 26 can be PBXs, CBXs, or LTUs. In the examples described herein, the peripheral shelves are LTUs.

The isochronous data links 27,38 allow bi-directional transmission of information between the controllers 20, 22 and the shelves 24, 26. The data links 27, 38 include first cables 28a–b and second cables 30a–b. Each cable carries PCM voice and signalling information for a corresponding peripheral shelf. Although the cabling can include any medium for transmitting data, such as optical fibers or coaxial cables, the cabling typically comprises twisted wire pairs.

Upon receiving isochronous data from the common control shelf 24, the first controller 20 encapsulates the isochronous data into a data frame that is transferrable over the packet network 32. The packet data frame is then transferred to the second controller 22, which extracts the isochronous data from the packet frame. The packet frame includes an address allowing the second controller 22 to determine which peripheral shelf is the destination for the isochronous data. The second controller 22 then transfers the isochronous data to the appropriate peripheral shelf.

The packet network 32 can be any commonly known packet-switched network, such as Fast Ethernet, IEEE Std. 803.2. The packet network 32 can include a pair of fiber optic cables 34, 36 allowing bi-directional communications between the first and second controllers 20, 22.

The first and second controllers 20, 22 can include identical functionality. Thus, the telecommunications system 18 can transfer voice and signalling information from the peripheral shelves 26 to the common control shelf 24 in the same manner that it is transferred from the common control shelf 24 to the peripheral shelves 26.

Figure 3:
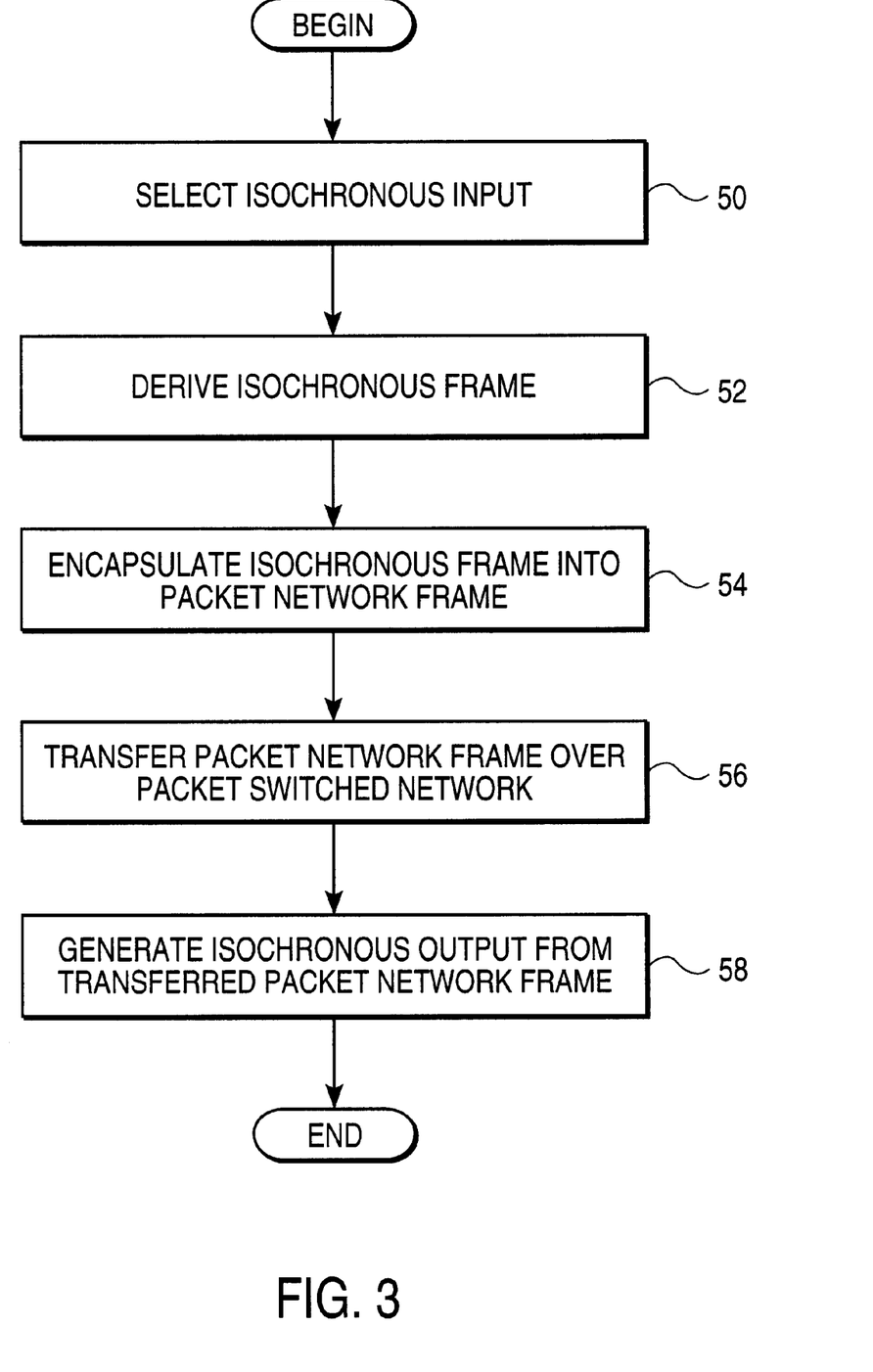
FIG. 3 illustrates a flow diagram of a method of using the telecommunications system of FIG. 2.

Referring now to FIG. 3, there is illustrated a flow chart of a method of using the system shown in FIG. 2. In step 50, a set of isochronous input channel from the common control shelf 24 is selected using a multiplexer that is included in the first controller 20. Typically, the isochronous data link 27 includes a plurality of individual input data streams available on one or more wires. The multiplexer regularly selects each of the data streams to produce a plurality of inputs representing the time slots conventionally associated with isochronous telephony communication. In essence, each input produced by the multiplexer represents a discrete sample from an input wire.

Figure 4:
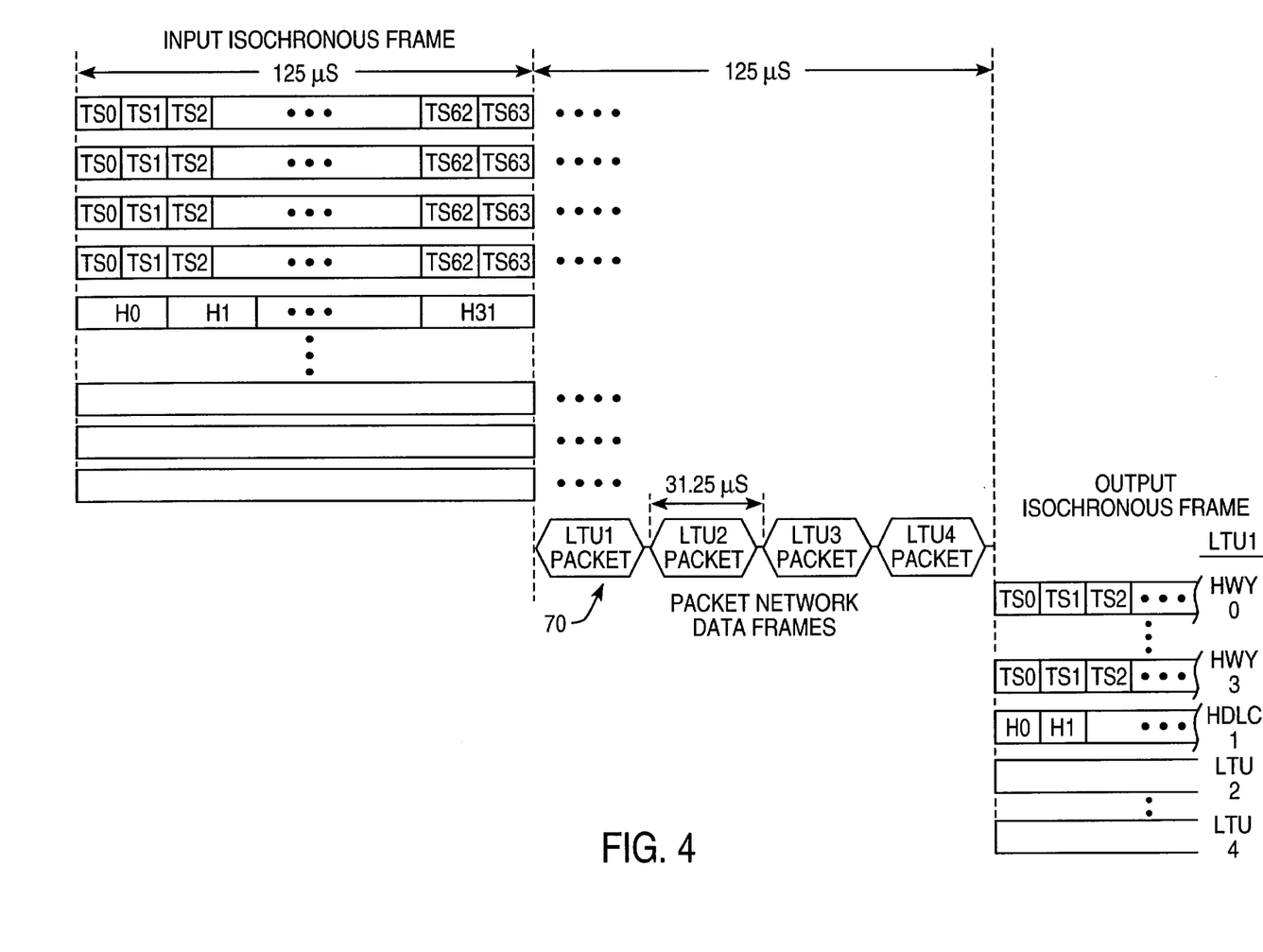
FIG. 4 illustrates an exemplary timing diagram of isochronous data and voice being transferred using the system of FIG. 2.

Next, in step 52, an isochronous frame is derived from the sampled input signals. FIG. 4 illustrates exemplary isochronous input frames. Each isochronous frame includes a plurality of time slots. These time slots are represented by digital bytes. The isochronous frame is generated by sampling each input line to generate a plurality of bits, and then assembling these bits into bytes representing each time slot in the isochronous frame. The bytes are then stored in a memory until all of the inputs for a complete isochronous frame have been received.

Figure 6:
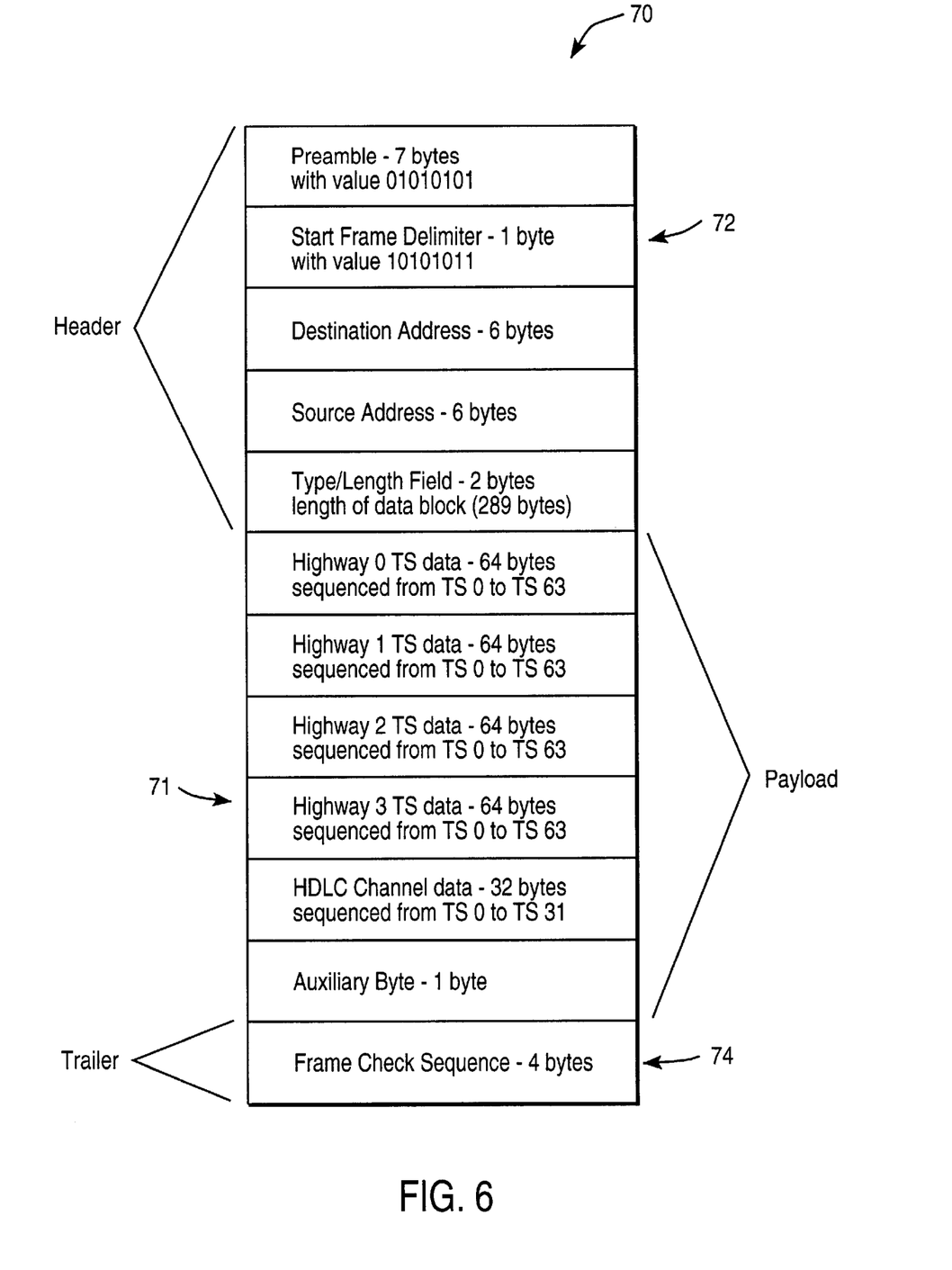
FIG. 6 illustrates an exemplary format for a packet data frame usable with the system of FIG. 2.

In step 54, the complete isochronous frame is encapsulated into a packet data frame. An example packet data frame is illustrated in FIG. 6. In FIG. 6, the payload data includes the isochronous frame. The packet frame is generated by adding a header and trailer to the isochronous frame. Next, in step 56 the packet frame is transmitted over the packet-switched network 42 to the second controller 22. In step 58, the second controller 22 generates an isochronous output based on the transferred packet network frame. The isochronous output includes the isochronous frame, which is extracted from the transferred packet frame by the second controller 22. The isochronous frame is extracted by stripping the header and trailer of the packet frame. The isochronous output is then transmitted to the corresponding peripheral shelf over the isochronous data link. The destination shelf is determined by examining a destination address included in the packet header.

Turning now to FIG. 4, there is illustrated an example timing diagram of data transfer from the common control shelf 24 to the peripheral shelf 26. The timing diagram illustrates the transfer of isochronous data for four peripheral LTUs. Each LTU interface includes four speech highways for carrying PCM voice and one channel for carrying signalling messages based on the conventional high level data link control (HDLC) protocol. Each speech highway operates a 4.096 Mbps, while the HDLC channel operates at 2.048 Mbps. An isochronous data frame consists of 64 PCM voice time slots for each speech highway, 32 time slots for HDLC, and one auxiliary byte. Thus, each isochronous frame comprises 289 bytes of data. Each time slot represents a byte of PCM voice or control information.

The first controller 20 multiplexes the speech highways and HDLC inputs for the LTUs to generate four isochronous data frames, where each frame corresponds to a respective LTU. Each isochronous frame is then encapsulated into a corresponding packet data frame 70. The data packet frames are transferred across the packet network 32 in sequence. The format of each packet data frame is identical. The transmission time for the four data packets is equivalent to the time period of one isochronous frame, which is 125 uS.

Upon receiving the packet data frames, the second controller 22 extracts the isochronous frames from the data packets and then demultiplexes the isochronous data so that it can be transmitted to the peripheral LTUs. Each speech highway time slot is assigned to a peripheral unit, such as a telephone. Accordingly, each LTU is capable of supporting up to 256 ports that are available to peripheral units.

Figure 5:
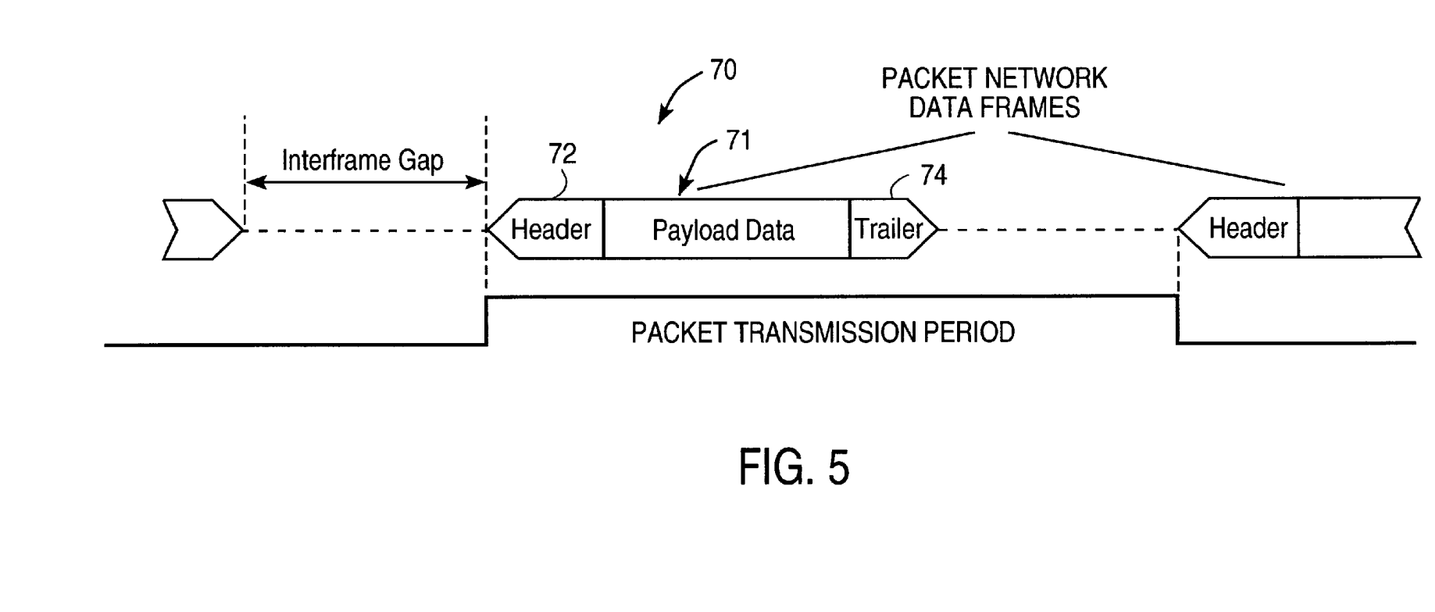
FIG. 5 illustrates a detailed diagram of the packet data frames shown in FIG. 4.

FIG. 5 illustrates a detailed timing diagram of the packet data frame 70. The packet data frame 70 includes a header 72, payload data 71, and a trailer 74. Each packet frame is transferred at regular intervals across the packet network 32. The regular intervals are indicated by the packet transmission period. Typically, there are four intervals per isochronous frame. Each interval has a period of 31.25 us.

FIG. 6 illustrates a possible format of the packet data frame 70. The header 72 includes a preamble field, a start frame delimiter, a destination address, a source address, and a type/length field. In the example shown, the preamble is seven bytes in length and is used to indicate the beginning of the packet frame. The start frame delimiter is typically one byte in length and is used to indicate that the preamble has ended and that the following bytes represent data or control information. The destination address is six bytes in length and indicates the destination peripheral shelf. The source address is also six bytes and indicates which shelf originated the data packet. The type/length field indicates the number of bytes transmitted in the data payload of the packet data frame.

The data payload 71 includes speech data from each of the four speech highways, as well as the HDLC data and auxiliary byte, for one of the LTUs. For each speech highway, 64 bytes representing the 64 time slots of an isochronous frame are included in the payload. Also included in the payload is the HDLC channel data. This data is 32 bytes in length. An auxiliary byte is added on the end of the data payload 71. The auxiliary byte conveys status information between controllers 20 and 22. Trailer 74 includes a frame check sequence that is four bytes in length. The frame check sequence can include cyclic redundancy control (CRC) data for insuring the integrity of the data packet frame.

Figure 7:
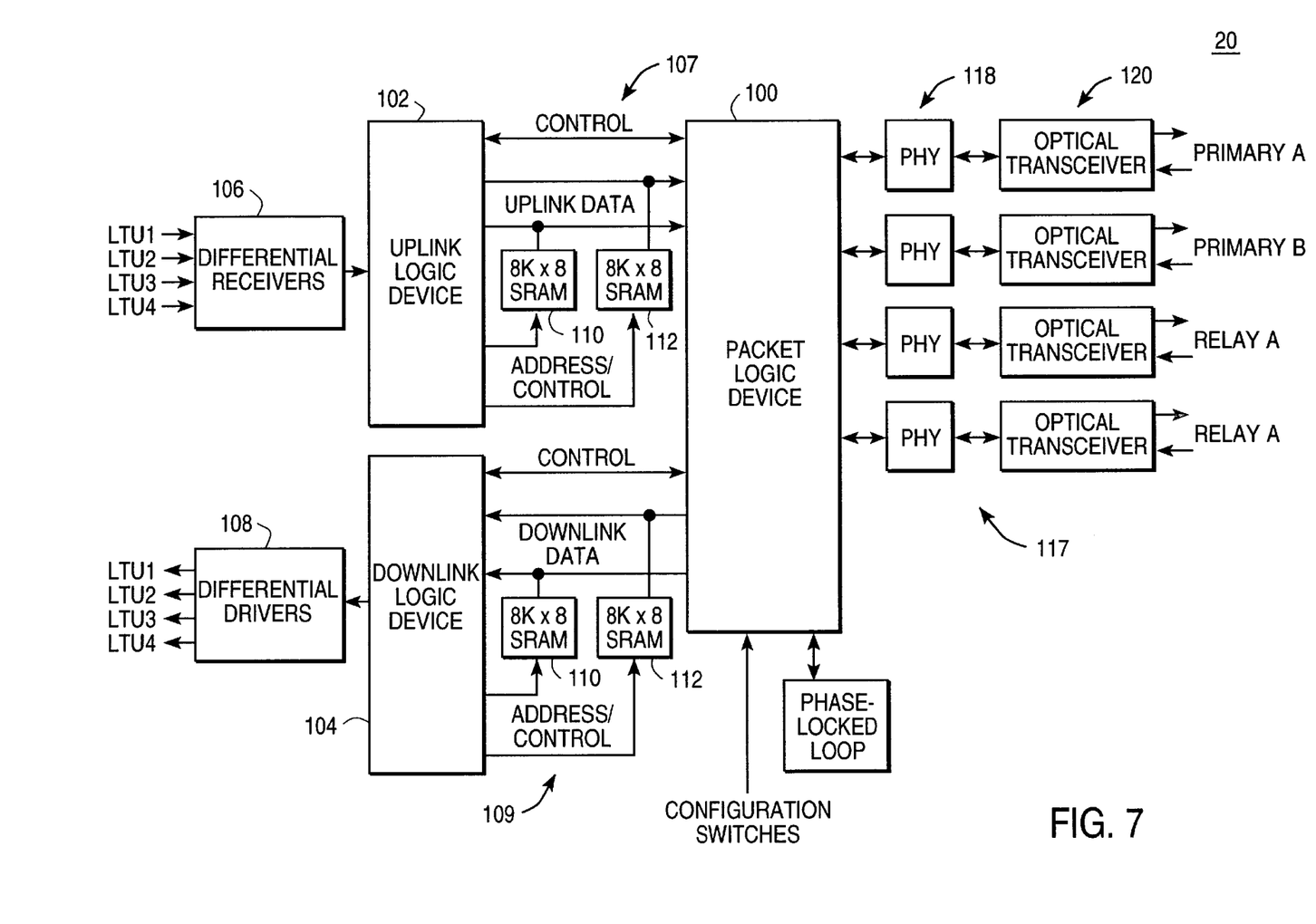
FIG. 7 is a detailed block diagram of one of the controllers shown in FIG. 2.

FIG. 7 illustrates a detailed block diagram of one of the controllers 20, 22. The controllers 20, 22 have identical functionality, and thus, only the first controller 20 is referred to in FIG. 7.

The controller 20 includes a packet logic device 100, an uplink logic device 102, a downlink logic device 104, an uplink buffer 107, a downlink buffer 109, a plurality of uplink differential receivers 106, a plurality of downlink differential drivers 108, and a packet network interface 117 comprising pluralities of physical layer controllers 118 and optical transceivers 120.

The controller 20 permits bi-directional communication, that is, it can simultaneously transfer two data streams—one moving from the circuit-switched network toward the packet network and another moving from the packet-switched network toward the circuit switched network.

To transfer data moving toward the packet-switched network, the differential receivers 106 generate digital data in response to differential line inputs from the LTUs. The digital data can be one or more serial bit streams. The uplink logic device 102 provides a multiplexing function and generates data bytes in response to the digital outputs of the differential receivers 106. The uplink logic device 102 also stores the bytes in the uplink buffer 107 in a logical fashion that represents the time slots of the isochronous frames.

The packet logic device 100 reads the isochronous frame data from the uplink buffer 107 and then packetizes this data into packet data frames for transfer over the packet network. To packetize the isochronous data, the packet logic device 100 adds the header and trailer information to each isochronous frame it reads from the uplink buffer 107. The packet logic device 100 then outputs packet frames to the physical layer controllers 118. The physical layer drivers 118 condition the packet data frames for transmission over the optical fiber link. The conditioned data frames are then transferred to the optical transceivers 120. The optical transceivers 120 convert the digital electronic signals into optical signals that are transmitted over a fiber optic network.

To transfer data moving toward the circuit-switched network, the optical transceivers 120 first convert the optical signals into digital electronic signals, which are then passed to the physical layer controllers 118. The physical layer controllers 118 decode the electronic signals into data link layer information that represents packet data frames. The data link information is the transmitted to the packet logic device 100. Upon receiving the data link information, the packet logic device 100 strips away the header and trailer information to extract the isochronous frame from the packet data frame. The isochronous frame is then stored in the downlink buffer 109.

The downlink logic device 104 reads the isochronous frame data from the buffer 109 and performs a de-multiplexing function to distribute isochronous data to the differential drivers 108. The downlink logic device 104 can receive data bytes from the buffer 109 and output serial bit streams to each of the differential drivers 108.

The packet logic device 100 and the uplink and downlink logic devices 102, 104 can be implemented using any form of digital hardware, such as one or more microprocessors, field programmable gate arrays (FPGAs), or application specific integrated circuits (ASICs). For example, the packet logic, uplink, and downlink logic devices 100–104 can be implemented using commonly available programmable logic devices, such as Part Nos. EPF6016QC208-3 and EPF10(K20RC208-3 from Altera Corporation. Some programmable devices, such as those available from Altera Corporation, can be configured on system power-up using a serial electronically programmable read only memory (EPROM).

Although any media can be used to implement the packet network, the example described herein utilizes a fiber optic packet-switched network. FIG. 7 shows an exemplary packet network interface 120 that permits up to four bi-directional optical links to be connected to the controller 20. There are two types of connections: primary and relay. Each of the two types have an A port and a B port to provide redundancy, thereby increasing reliability. The primary A port is used during normal operation, as depicted in FIG. 2.

The A and B ports of the primary and relay connections support fiber link redundancy. Link redundancy is achieved by simultaneously transmitting identical content on both the primary A and B ports. In the receive direction, the A port is the default. As long as a signal is being received on port A, it will remain the active port. However, if the signal on port A is lost, the controller 20 switches over to port B and begins reading data from this port.

The relay connections allow the controller 20 to act as a packet relay station between other controllers connected to the fiber-optic packet network. This permits the overall end-to-end length of the packet network to be extended. For relay mode operation, packets that are received on the primary ports are repeated on the relay ports. Additionally, the receiving controller checks a destination address included in the packet to determine whether further processing to the incoming packet is warranted. Packets that are received on the relay ports are re-transmitted on the primary ports without any address checking. All uplink isochronous data received by the relay controller is transmitted on the primary ports.

Figure 11:
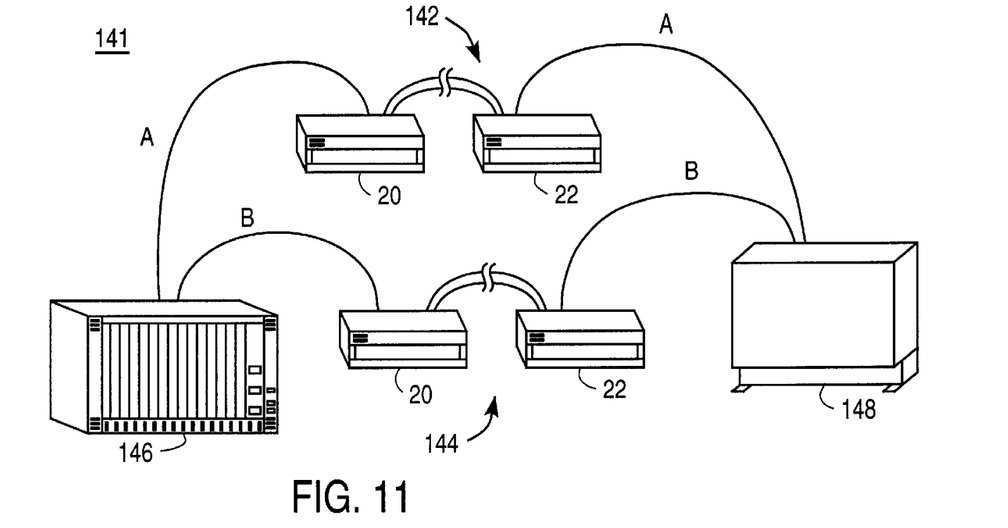
FIG. 11 illustrates a telecommunications system using redundant controllers.
Figure 12:
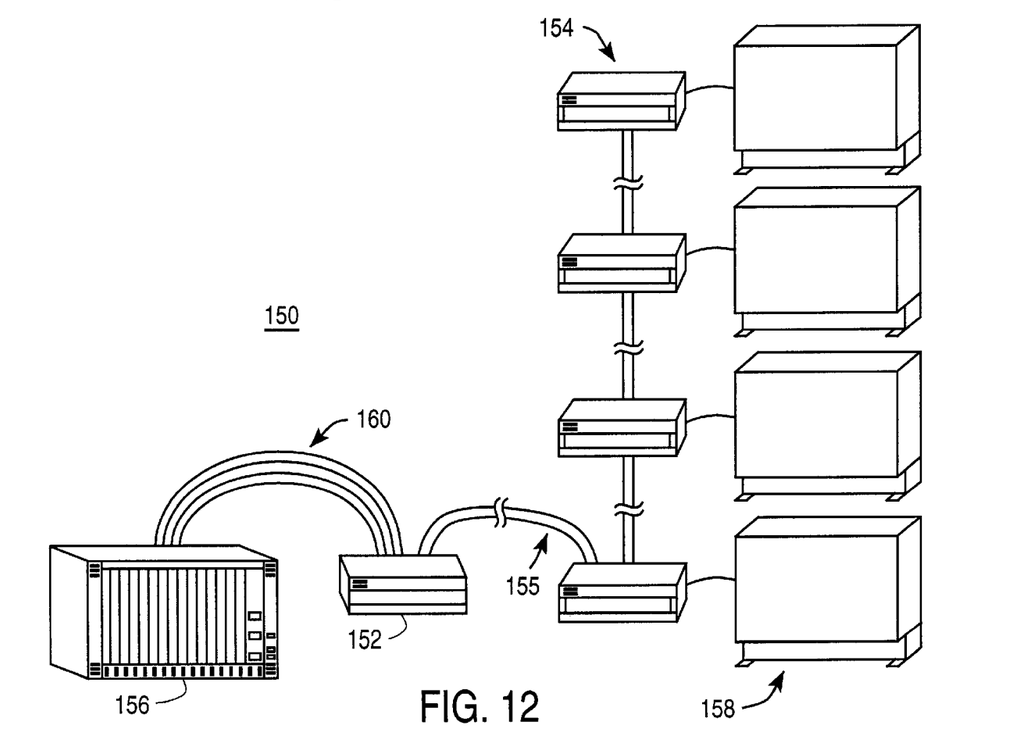
FIG. 12 illustrates a telecommunications system configured to relay packets from remote shelves.
Figure 13:
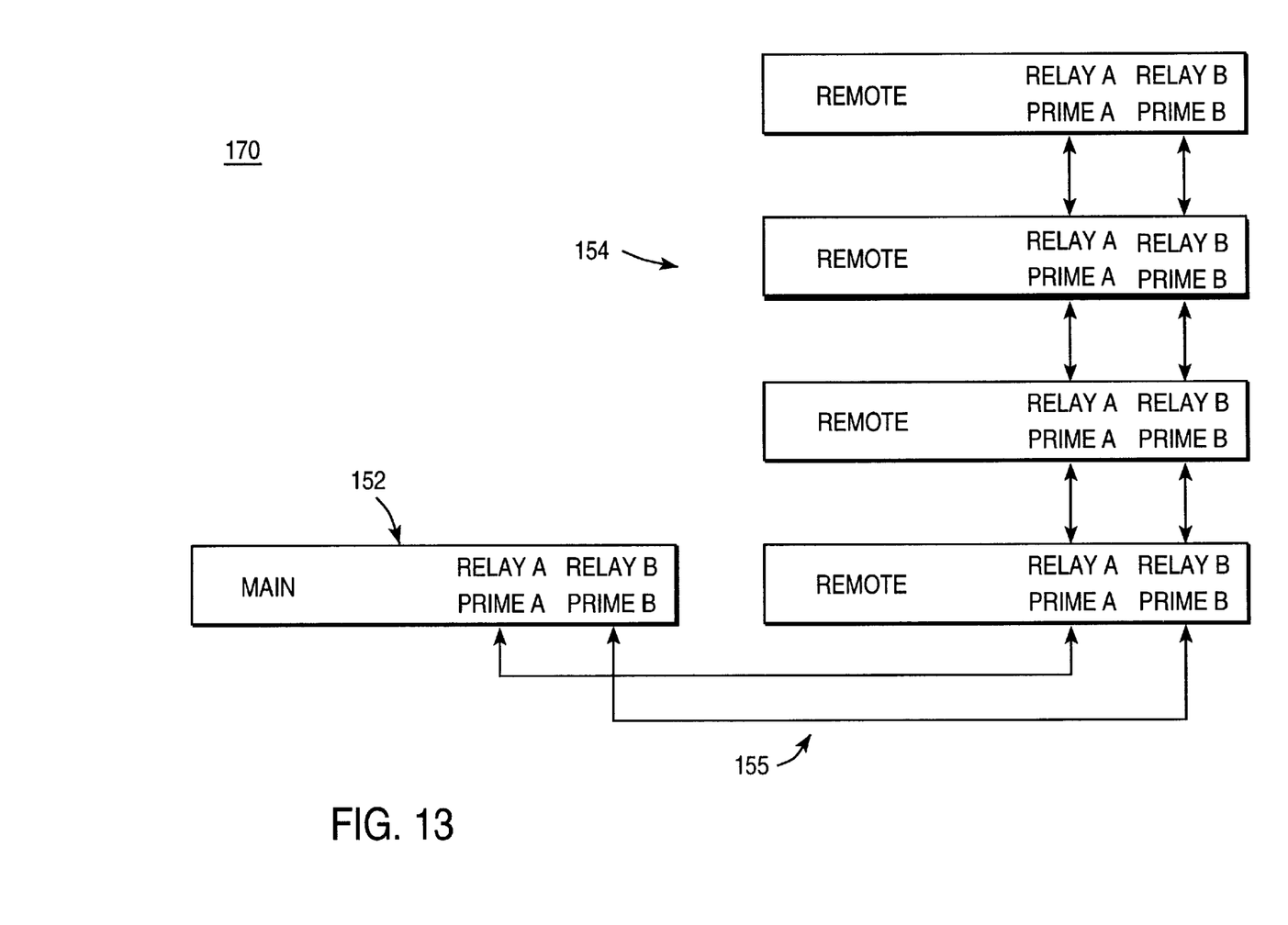
FIG. 13 illustrates the connections used to configure to the controllers for relay operation as depicted in FIG. 12.

The redundant and relay modes of operation of the controller are described in further detail in reference to FIGS. 11–13.

The packet logic device 100 communicates with the physical layer controllers 118 using media independent interface (MII). The MII is a standard interface for Ethernet devices. The MII transports 100 Mbps of Ethernet data at 25 MHz over 4-bit wide transmit and receive data paths. Each of the four physical layer controllers 118 has an independent data interface to the packet logic device 100 allowing simultaneous operation.

The physical layer controllers 118 can implement standard Ethernet physical layer functions specified by IEEE 802.31 10BASE-T and 100BASEFX Ethernet protocols. These functions include 4B/5B encoding/decoding and injecting, 4B/5B code group alignment, non return to zero inverted (NRZI) encoding/decoding, serial/parallel conversion, physical layer clock generation, and PECL interface to the optical transceivers 120. These functions can be provided by commonly available components, such as part No. DT83843 PHYTER from National Semiconductor Corporation of Santa Clara, Calif.

The optical transceivers 120 can provide either a multi-mode optical interface or a single mode interface for longer distances. The transceivers are designed for FDDI or Fast Ethernet applications. The data rate on the fiber can be 125 Mbaud. Thus, the optical packet network provides adequate bandwidth to support up to four of LTUs, such as those described in reference to FIG. 4. The optical transceivers and interface to the fiber optic cables are commonly available and can be implemented using standard components.

The differential receivers 106 and the differential drivers 108 can be connected to the control interfaces of either the common control or peripheral shelves. In the example shown, up to four separate LTU connections can be supported by a single controller. The signals at each connection are TTL-differential transmitted on twisted wire pairs. The differential receivers 106 can be implemented using standard components, such as Part No. 75ALS197 from Texas Instruments; while the differential drivers 108 can be implemented using standard components, such as Part No. 75ALS192 from Texas Instruments.

The uplink and downlink buffers 107, 109 each consist of two independent fast static RAMs (SRAMs) 110, 112. These buffers can be implemented using standard components, such as Part No. CY7C185-25 from Cyprus Semiconductor Corporation. The buffers operate in a ping-pong manner, that is, each SRAM is alternatively accessed by either the uplink/downlink logic devices or the packet logic device 100. Consequently, one of the SRAMs can be accessed by the uplink/downlink logic device while the other SRAM can be simultaneously accessed by the packet logic device 100. To the packet logic device 100, the uplink/downlink buffers can function as first-in-first-out (FIFO) buffers. Alternatively, the uplink and downlink buffers 107, 109 can be implemented using a dual port memory instead of two separate SRAMs.

Figure 8:
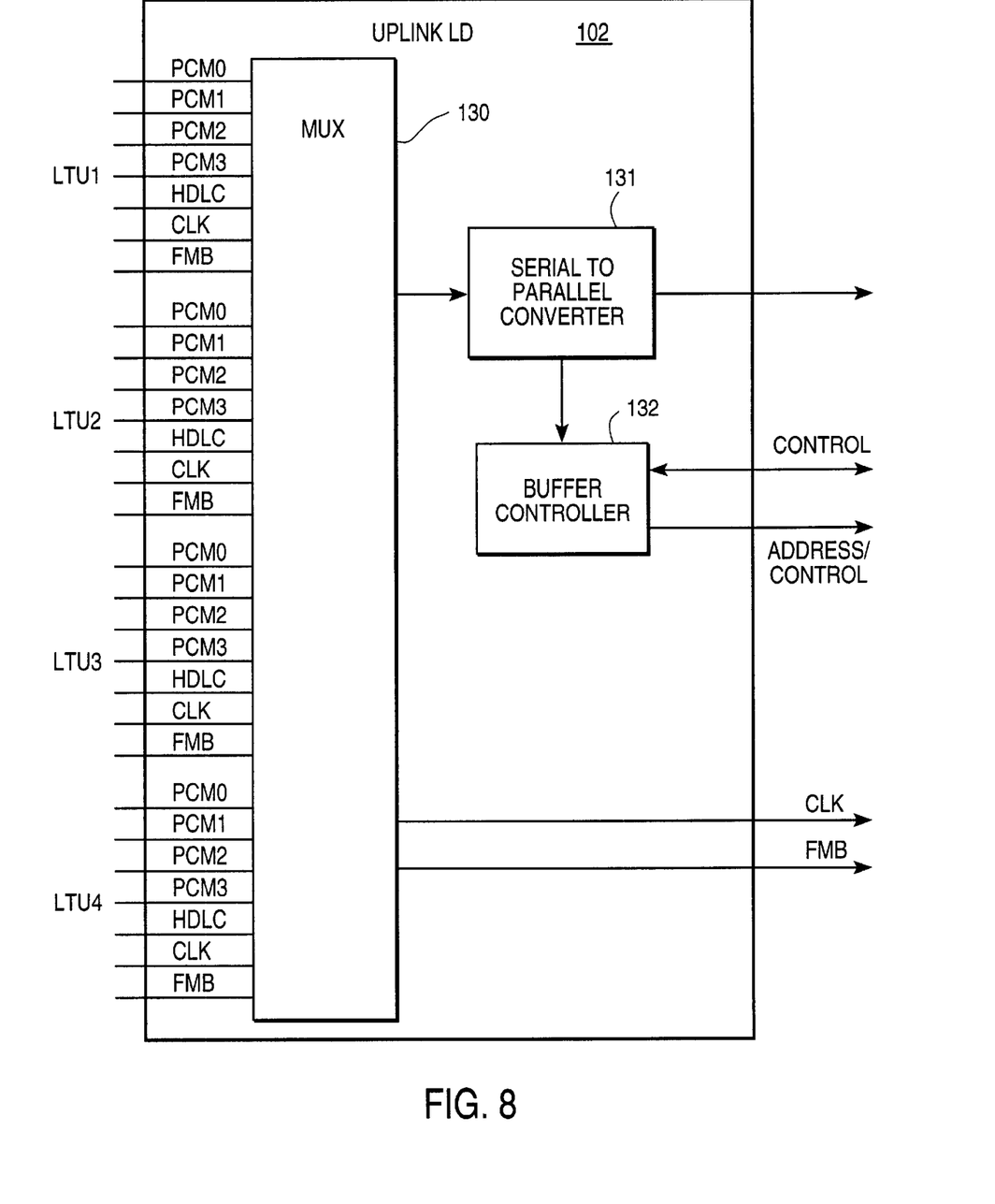
FIG. 8 is a detailed block diagram of the uplink logic device shown in FIG.7.

Each SRAM can store four isochronous data frames, or one isochronous frame per LTU. Isochronous data for each LTU can be stored in 289 byte blocks located at 512 byte address boundaries. FIG. 8 illustrates a detailed block diagram of the uplink logic device 102. The uplink logic device 102 handles data moving from the control interface of the isochronous telecommunications equipment toward the fiber link. Its main task is to multiplex and shift the serial data received on the PCM voice and HDLC highways to parallel data and store it in the external uplink buffer 107. To accomplish this, the uplink logic device 102 includes a multiplexer (MUX) 130 and a serial-to-parallel converter 131. The MUX 130 samples each input to produce a digital bit at its output. Generally, the MUX 130 operates in accordance with multiplexing functions specified for conventional isochronous telecommunications. The converter 131 assembles the bits into digital words representing a time slot on each input and then transfers the digital words to storage locations in the uplink buffer 107.

The uplink logic device 102 also includes a buffer controller 132 that controls access to the uplink buffer 107. In response to signals from the converter 130, the buffer controller 132 generates address and write enable signals, which permit the converter 131 to store data in the SRAMs. In addition, the buffer controller 131 permits the packet logic device 100 to read the SRAMs in response to BUFFER SELECT and BUFFER READ signals from the packet logic device 100. These signals are included in the bi-directional control bus connected to the buffer controller 132. The uplink logic device 102 also multiplexes isochronous system clock signals (CLK) and frame mark signals (FMB) from the isochronous shelves, which it then provides to the packet logic device 100. These signals can be used by the packet logic device 100 to synchronize the transmission of packet frames over the packet network.

Figure 9:
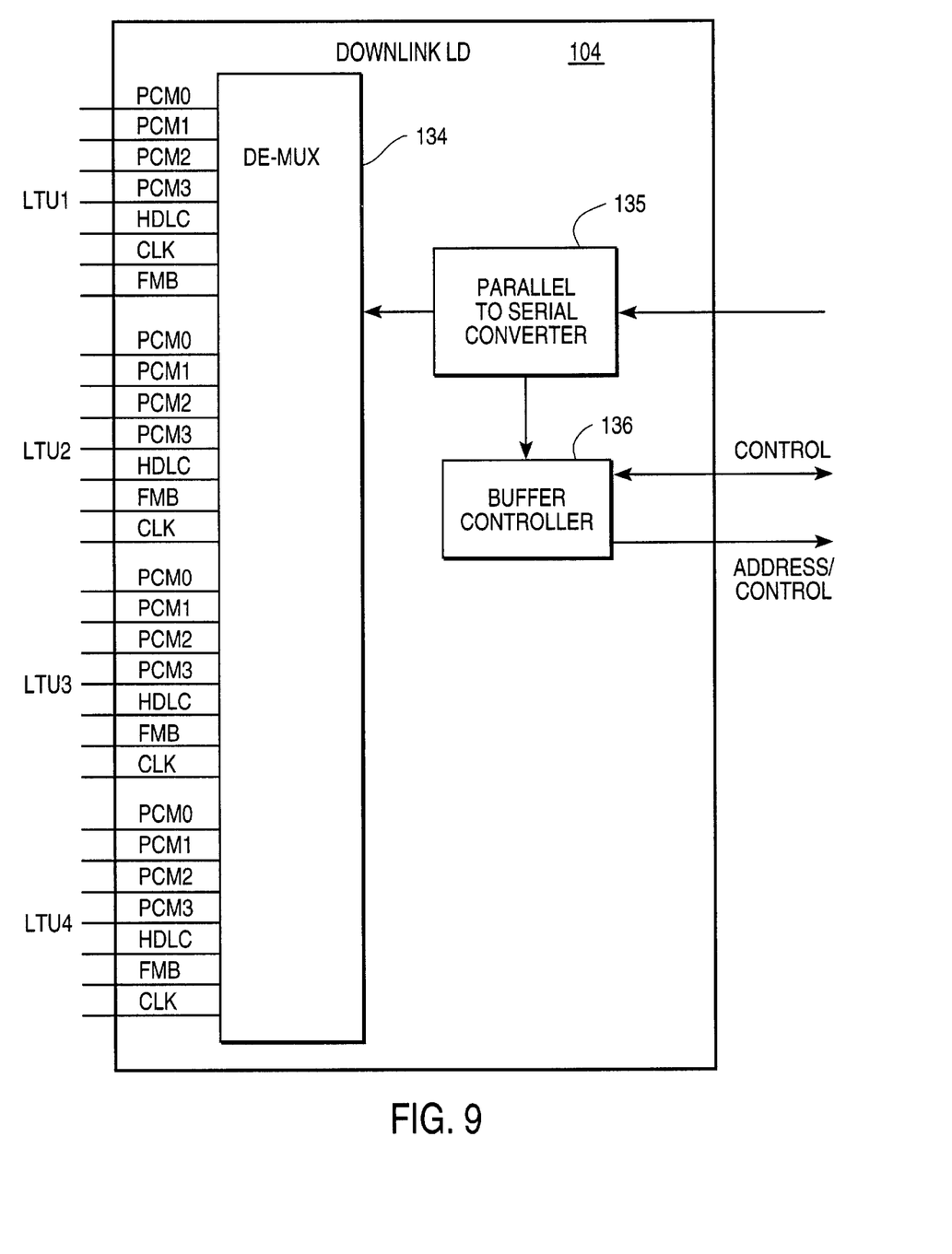
FIG. 9 is a detailed block diagram of the downlink logic device shown in FIG. 7.

FIG. 9 shows a detailed block diagram of the downlink logic device 104. The downlink logic device 104 handles data moving from the fiber link toward the control interface of the isochronous telecommunications equipment. Its task is to read data stored in the downlink buffer 109 and shift it out as serial data on the PCM voice and HDLC highways. To accomplish this, the downlink logic device 104 includes a de-multiplexer (DE-MUX) 134 and a parallel to serial converter 135. The DE-MUX 134 generally operates in accordance with de-multiplexing functions specified for conventional isochronous telecommunications. The converter 135 reads digital words from the buffer 109 and then shifts the words to provide a serial bit stream to the DE-MUX 134.

The downlink logic device 104 also includes a buffer controller 136 that controls reads/writes to the downlink buffer 109. In response to requests from the packet logic device 100, the controller 136 generates address and write enable signals, which permit the packet logic device 100 to write to the SRAMs. The packet logic device 100 requests write access to the SRAMs using BUFFER SELECT and BUFFER WRITE signals included in a bi-directional control bus. In response to signals from the converter 135, the controller 136 generates address and read enable signals that allow the converter 135 to retrieve words from the SRAMs.

The downlink logic device 104 generates an isochronous system clock output (CLK) and frame mark signals (FMB) that are output by the DE-MUX 134 to each of the isochronous shelves. The CLK signal indicates the isochronous output bit-rate of the controller 20 and can be based on the output of a phase-locked loop (PLL) included in the controller 20. The frequency of the CLK signal in the main site controller is based upon the clock of the connected PBX. The frequency of the CLK signal in the remote site controller is derived from the received packet arrival rate. Since packets are transmitted by the main controller at intervals synchronous to the PBX clock, the arrival rate (frequency) at the remote controller is dependent on the PBX clock. By using the packet arrival rate as the reference input to a phase-locked loop, this frequency can be multiplied by a set factor to result in an output clock of the PLL that operates at the same average frequency as the PBX clock. For proper operation of the system it is preferrable that the remote controller clock be the same average frequency as the PBX clock. Otherwise, buffer overflows and underflows could occur resulting in degraded communications.

Techniques for controlling the PLL to provide optimum performance can include using an arrival window and correction thresholds. The arrival window is a predetermined, regularly-occurring period of time during which a packet is expected to be received. A received packet that arrives outside of the window can be disregarded. This will protect the PLL from responding to packets that experience unusual delay.

The correction thresholds allow variance of packet arrival within the window to exist. A correction threshold is a predetermined point in time occurring within the arrival window. For example, a typical arrival window can include an early threshold occuring near the beginning of the arrival window and a late threshold occurring near the end of the arrival window. As long as the packets arrive between the thresholds, there is no need to adjust the frequency of the PLL. However, the PLL frequency will be corrected when a predetermined number of successive packets arrive prior to the early threshold or after the late threshold.

The techniques for controlling the PLL can be implemented using state machines executing in a programmable logic device. A packet arrival signal can be generated based on the detection of the preamble of a received packet. This signal can be provided to the PLL and the state machine controlling the PLL to generate the local clock.

Figure 10:
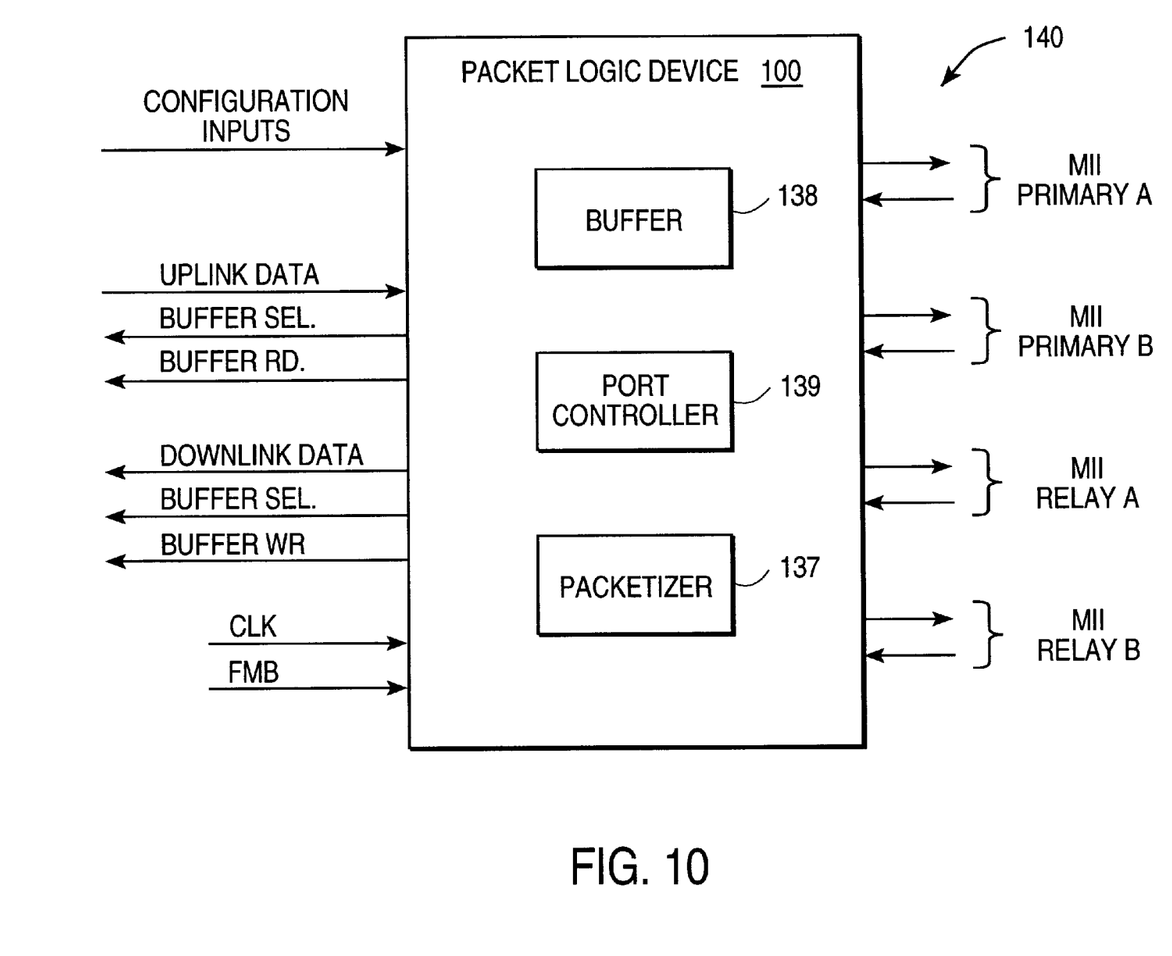
FIG. 10 is a detailed block diagram of the packet logic device illustrated in FIG. 7.

FIG. 10 illustrates a detailed block diagram of the packet logic device 100. The packet logic device 100 includes a packetizer 137, an internal buffer 138, and a port controller 139. The main function of the packet logic device 100 is to control data movement between the circuit-switched and packet-switched networks.

The packetizer 137 encapsulates and de-encapsulates isochronous data. To encapsulate data from the circuit-switched network, the packetizer 137 reads an isochronous frame data from the uplink buffer 107 and adds header and trailer information to the data to permit transfer over the packet network. To read data from the buffer, the packetizer 137 issues BUFFER SELECT and BUFFER READ signals that cause the uplink logic device 102 to generate SRAM address and control signals, which, in turn, cause the SRAMs to output data to the packet logic device 100.

The packetizer 137 can generate a packet header as described in FIG. 6. The header is inserted into the uplink data stream prior to the isochronous payload data. The packet logic device 100 also generates a 32-bit Ethernet CRC and appends it to the isochronous data as a trailer. Isochronous payload data is directly read from the uplink buffer 107. Preferably, it is not necessary to buffer uplink data frames internally to the packet logic device 100.

The packetized data is then passed to one or more of the MII buses 140. The MII buses 140 couple the packet logic device 100 to the physical layer controllers 118. Each MII bus can include a pair of 4-bit data buses (not shown) for bi-directional transfer of packet data. The MII buses are activated according to the configuration state of the port controller 139.

In addition, the packetizer 137 also de-encapsulates payload data contained within packets that are received from the packet network. De-encapsulation is accomplished by removing the header and trailer information and passing only the payload data to the downlink buffer 109. To write data into the downlink buffer 107, the packetizer 137 issues BUFFER SELECT and BUFFER WRITE signals that cause the downlink logic device 104 to generate SRAM address and control signals. In turn, these signals cause the SRAMs to store data from the packet logic device 100.

Packets received from the packet network can be temporarily stored in the internal buffer 138 of the packet logic device 100. This allows received packets to be aligned to the downlink isochronous shelf. In a manner similar to the external uplink/downlink buffers 107–109, a ping-pong technique is used to access data packets stored in the internal buffer 138. Accordingly, two independently addressable packet buffers are included in the buffer 138.

The port controller 139 controls the activity of the MII buses 140.

Each MII bus provides a bi-directional interface to a separate fiber optic network connection. Accordingly, the port controller 139 can select any combination of the MII buses, and thus, optical network connections, for transferring packet data. The port controller 139 can configure bus activity based on user inputs. These user inputs can be generated by manually setting switches that are in communication with the packet logic device 100. By setting the configuration of the MII buses 140, the port controller 139 can set the operational mode of the controller 20.

FIGS. 11 and 12 illustrate alternative system configurations incorporating controllers that can be in accordance with an embodiment of the present invention.

FIG. 11 illustrates a fully redundant system configuration 141. This configuration includes an A-side network link 142 and a B-side network link 144. In addition to providing redundant fiber links, the network links 142, 144 provide redundant communication paths between a common control shelf 146 and a peripheral shelf 148. Thus, if one link fails, the other can maintain communication between the shelves. The combination of redundant fiber links and redundant communication paths markedly increases system reliability.

Each network link includes a pair of controllers 20, 22. The controllers of each pair are connected to one another using a packet network, as described with respect to FIG. 2. The controllers are also connected to the shelves using isochronous circuit-switched data links. In the example shown, the A-side network link 142 can couple the A-side common control interfaces of the shelves, while the B-side network link 144 can couple the B-side common control interfaces of the shelves.

FIG. 12 illustrates a telecommunications system 150 incorporating a plurality of controllers 154 configured for relay mode operation. In this configuration, a main controller 152 is connected to a common control shelf 156 using a switched network 160. The main and remote controllers 152–154 can each include the functionality of the controller 20 previously described herein. In the example shown, the switched network 160 includes a cable dedicated to each of the four peripheral shelves 158. The main and remote controllers 152–154 are linked over a packet network 155. isochronous data is packetized and then transferred between the shelves over the packet network 155. Each remote controller 154 is connected to a corresponding peripheral shelf 158 using an isochronous circuit-switched data link.

FIG. 13 illustrates a connection diagram 170 for the relay mode configuration shown in FIG. 12. With the exception of the remote controller that is directly connected to the main controller 152, the primary ports and relay ports of remote controllers are connected together.

When a remote controller receives a packet on its primary input, it checks the destination address to determine whether the packet is destined for the correspondingly attached isochronous shelf. If so, the controller de-encapsulates the data packet and passes the isochronous contents through its downlink data stream to the shelf. Otherwise, the controller ignores the contents of the packet and re-transmits the packet on its relay port output. This procedure allows the remote controllers 154 to pass data between one another and to the main controller 152.

In each remote controller 154, packets generated by the local shelf and those received on the relay port are transmitted on the controller's primary port. Therefore, each remote controller 154 can include a means for multiplexing local uplink packets with received relay packets, as well as a means for buffering inputs received on its relay inputs.

While specific embodiments of the present invention have been shown and described, it will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. A telecommunications system, comprising:
   a multiplexer configured to generate a first digital value in response to a plurality of isochronous telecommunications input signals received over a first circuit switched connection;
   a packetizer logic device configured to encapsulate the first digital value into an output data frame that is transferrable over a packet-switched network;
   a buffer for storing the first digital value;
   a plurality of input differential receivers for generating a plurality of multiplexer input signals based on the isochronous telecommunications input signals;
   means for de-encapsulating an input data frame, receivable from the packet network, to generate a second digital value;
   a buffer for storing the second digital value;
   a de-multiplexer configured to generate a de-multiplexer output signal based on the second digital value; and
   an output differential driver for generating an isochronous telecommunications output signal based on the de-multiplexer output signal over a second circuit-switched connection.

2. A telecommunications system, comprising:
   a first controller responsive to a first clock signal and a first isochronous telecommunications signal received over a first isochronous circuit-switched connection, the first controller encapsulating information derived from the first isochronous telecommunications signal into a data frame that is transferrable over a packet-switched network; and
   a second controller adapted to receive the data frame from said packet-switched network and configured to generate a second isochronous telecommunications signal and a second clock signal in response to the data frame, wherein the second clock signal has the same average frequency as the first dock signal, the second isochronous telecommunications signal for transmission over a second isochronous circuit switched connection.

3. The system of claim 2, wherein the first controller includes a multiplexer for selecting the first isochronous telecommunications signal from a plurality of isochronous input signals.

4. The system of claim 2, further comprising:
a packet-switched network coupling the first and second controllers.

5. The system of claim 4, wherein the packet-switched network includes a fiber optic cable.

6. The system of claim 2, further comprising:
a third controller, operatively coupled to the second controller, wherein the second controller relays at least one data frame between the first and third controllers.

7. The system of claim 2, wherein the first isochronous telecommunications signal is produced by a private branch exchange (PBX).

8. The system of claim 2, wherein the second isochronous signal is received by a line trunk unit (LTU).

9. The system of claim 2, wherein the data frame has a format based on an Ethernet data frame.

10. A telecommunications system, comprising:
means for responding to a first clock signal and a first isochronous telecommunications signal received over a first isochronous circuit-switched connection, the first responding means encapsulating information derived from the first isochronous telecommunications signal into a data frame that is transferrable over a packet-switched network; and
means for receiving said data frame from said packet-switched network and generating a second isochronous telecommunications signal and a second clock signal in response to the data frame, wherein the second clock signal has the same average frequency as the first clock signal, the second isochronous telecommunications signal for transmission over a second isochronous circuit switched connection.

11. In a telecommunications system, a method of transferring an isochronous frame over a packet-switched network, which comprises the following steps:
selecting an isochronous input signal from a first circuit-switched connection using a multiplexer;
deriving the isochronous frame from the isochronous input signal:

encapsulating the isochronous frame into a packet network frame;
transferring the packet network frame over the packet-switched network;
receiving the packet network frame from said packet-switched network at a second circuit-switched connection; and
generating an isochronous output signal at the second circuit-switched connection based on the transferred packet network frame.

12. The method of claim 11, further comprising the step of:
assigning a media access control (MAC) layer frame header and trailer to the packet network frame.

13. The method of claim 11, wherein the step of generating includes:
extracting the isochronous frame from the transferred packet network frame.

14. The method of claim 11, further comprising the steps of:
selecting an isochronous output port; and
transmitting the isochronous output signal via the isochronous output port to a telecommunications equipment device.

15. A telecommunications system, comprising:
a packet-switched network;
a first controller for transmitting a plurality of data packets over the packet-switched network based on a first clock signal received from a first circuit-switched network; and
a second controller receiving said data packets from said packet-switched network and communicating with the packet-switched network to produce a second clock signal based on the arrival rate of the data packets, the second clock signal having the same average frequency as the first clock signal, said second controller generating a signal for transmission over a second circuit-switched network.

16. The telecommunications system of claim 15, wherein the second controller disregards ones of the data packets arriving outside of an arrival window.

17. The telecommunications system of claim 15, wherein the second controller includes a phase locked loop (PLL).

18. The telecommunications system of claim 17, wherein the frequency of the PLL is adjusted based on at least one correction threshold.

* * * * *